G. SIPP & A. McLANE.
REEL FOR REELING MACHINES.
APPLICATION FILED DEC. 12, 1908.
943,798. Patented Dec. 21, 1909.
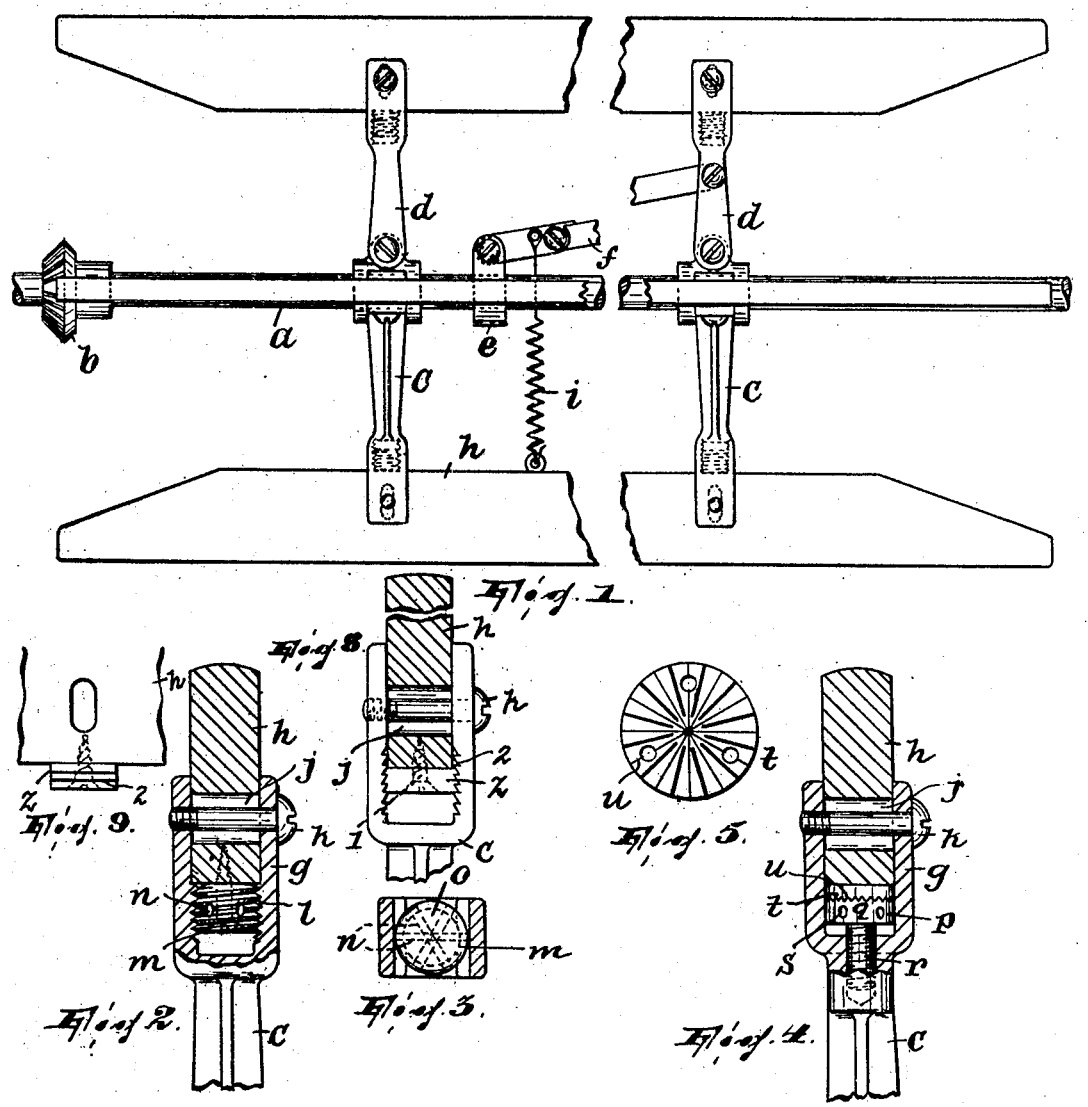
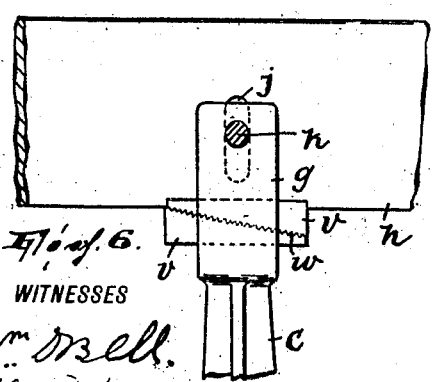
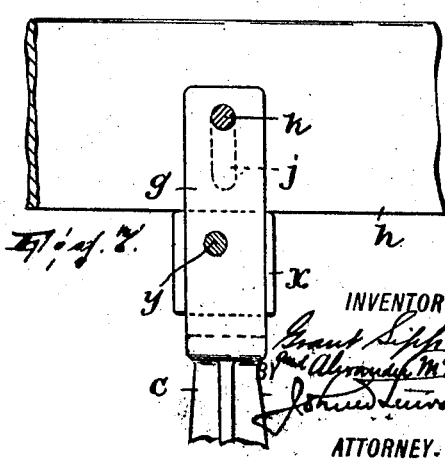

UNITED STATES PATENT OFFICE.

ALEXANDER McLANE, OF LANSFORD, PENNSYLVANIA, AND GRANT SIPP, OF PATERSON, NEW JERSEY.

REEL FOR REELING-MACHINES.

943,798.  Specification of Letters Patent.  Patented Dec. 21, 1909.

Application filed December 12, 1908. Serial No. 467,181.

*To all whom it may concern:*

Be it known that we, ALEXANDER McLANE and GRANT SIPP, citizens of the United States, residing in Lansford, Carbon county, Pennsylvania, and Paterson, Passaic county, New Jersey, respectively, have invented a certain new and useful Improvement in Reels for Reeling-Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to reeling machines and it consists in certain improvements in a reel of the type of that shown in our application for U. S. Letters Patent filed of even date (Serial No. 467,182) herewith, which reel is constructed so as to allow radial adjustment of its blades for the purpose of compensating for the reduction in circumference which attends planing or otherwise smoothing down the blades of the reel to remove notches or other roughness produced by careless handling of the reel, it being apparent that when the blades of the reel are so planed or smoothed down it becomes impossible to continue to gage accurately the number of yards reeled off by the number of revolutions accomplished. In the present instance, the adjustment is effected by devices acting against the under edge or face of the blade.

Referring to the accompanying drawing, Figure 1 is a side elevation of the improved reel; Fig. 2 is a detail view, partly in section, of one of the arms, a blade and the adjusting means; Fig. 3 is a transverse sectional view of Fig. 2 taken between the blade and the adjusting device; Fig. 4 is a view similar to Fig. 2, illustrating a modification; Fig. 5 shows a detail of Fig. 4; and, Figs. 6, 7, 8 and 9 illustrate three other modifications of the invention.

The body of the reel comprises, as usual, the shaft $a$ carrying a bevel pinion $b$, the two spiders $c$, preferably four-armed, secured on the shaft and each having one of its arms $d$ pivoted to swing on its inner end in a radial plane, the collar $e$ fixed on said shaft, and the toggle $f$ connecting one of said pivoted arms with the collar. The ends of the arms are forked as at $g$. In the manner to be described, the blades $h$ are arranged in the forked ends of the arms, and that blade which is moved in the pivoted arms is normally held in the extended position by a spring $i$ which connects the toggle with the opposite blade and acts to hold the toggle extended.

Each blade is provided with a radial slot $j$ in the portion thereof directly received by the forked ends of the arms, said slot being penetrated by a screw $k$ which is passed freely through one part of the fork of the arm and is screwed into the other part of said fork, whereby the screw may be made to clamp the blade between said parts of the fork.

Referring to Figs. 2 and 3, screw threading $l$ is formed in the forked portion of each arm below the blade $h$ and into this is screwed a threaded adjusting plug $m$, having crossing holes $n$ to receive a nail or other implement for turning and thus adjusting it, the top of the plug being preferably convex, as at $o$, (Fig. 3) particularly in the case of the plugs for the collapsing blade, so that it will not unduly wear or mar the blade, and the plug being attached to the blade by a screw.

In Fig. 4, a plug $p$ having a head $q$ and a threaded shank $r$ tapped into the body of the arm is shown, the head having crossing holes $s$ to receive the adjusting implement. We show in Figs. 4 and 5 a device to hold the adjusting plug against turning after adjusting, the same being a metallic disk $t$ set in the wood of the blade $h$, the plug and disk having mating radial serrations $u$.

In Fig. 6, reversely arranged wedge blocks $v$ are arranged in the fork of each arm under the blade, the same having their contacting faces $w$ serrated so that when the wedge blocks are adjusted longitudinally of each other in opposite directions they will retain the adjustment.

In Fig. 7 a polygonal block $x$ is arranged eccentrically on a pivot $y$ in the fork of each arm under the blade; the distances between the geometrical axis of block $x$ and any two sides of the block being different, different radial adjustments of the blade may be secured according to which face of the block is presented upon turning the block on its pivot.

In Figs. 8 and 9 a block $z$ is attached by a screw $l$ or the like to the inner edge of the blade and it and the inside of the forked portion of the arm $c$ have mating serrations 2.

It will be understood that the threading $l$ in Fig. 2 constitutes, in the broad sense, serrations.

In practice, the adjusting devices having been set in the proper positions to secure the desired adjustment of the blades, the screw $k$ is set so as to hold the blade against outward movement under the action of centrifugal or other forces; in all of the forms, when the screw $k$ is thus adjusted, it causes the forked portion $g$ to bind not only against the blade, but against the adjusting device, the engagement between the latter and each radial face of the portion $g$ acting to maintain the adjusting device in fixed relation where adjusted.

Having thus fully described our invention, what we claim as new and desire to secure by Letters Patent is:

1. In a reel, the combination of the reel body having forked portions, blades arranged in said forked portions, one of said blades being movable radially of the reel body, adjusting means arranged in the reel body and bearing against the inner face of the movable blade and also engaging the inner faces of said forked portions, and means for clamping the forked portions into contact with the blade and the adjusting means, substantially as described.

2. In a reel, the combination of the reel body having forked portions, blades carried by the reel body substantially parallel with its axis and one of them being arranged in said forked portions and movable radially of the reel body, and adjusting devices arranged in said forked portions and bearing against the inner face of said blade, said devices and the forked portions having serrations engaged with each other, substantially as described.

In testimony that I claim the foregoing, I have hereunto set my hand this 4th day of December, 1908.

ALEXANDER McLANE.

Witnesses:
OSCAR KUDNER,
JAMES P. BULMER.

In testimony that I claim the foregoing, I have hereunto set my hand this 11th day of December, 1908.

GRANT SIPP.

Witnesses:
JOHN W. STEWARD,
WM. D. BELL.